United States Patent

[11] 3,628,117

[72] Inventor Walter S. Eggert, Jr.
Huntingdon Valley, Pa.
[21] Appl. No. 15,537
[22] Filed Mar. 2, 1970
[45] Patented Dec. 14, 1971
[73] Assignee Boothe Airside Services, Inc.

[54] AUTOMATIC LEVELLER SWITCHING SERVOMOTOR CONTROL CIRCUIT
4 Claims, 6 Drawing Figs.

[52] U.S. Cl. ..................................................... 318/675,
318/673, 318/678
[51] Int. Cl. ....................................................... G05b 11/01
[50] Field of Search ............................................ 318/672,
673, 675, 648

[56] References Cited
UNITED STATES PATENTS
2,717,344 9/1955 Jackson ........................ 318/675

Primary Examiner—T. E. Lynch
Attorneys—Harold T. Stowell, Harold L. Stowell, Albert Lockman and Thomas J. Greer, Jr.

ABSTRACT: An automatic levelling device is employed to maintain two movable bodies in the same relative positions with respect to each other. When the position of one body changes in a given plane, motor means are actuated to restore the bodies to their original relative positions.

Patented Dec. 14, 1971

INVENTOR.
WALTER S. EGGERT, JR.
BY
Edward M. Farrell
ATTORNEY

AUTOMATIC LEVELLER SWITCHING SERVOMOTOR CONTROL CIRCUIT

In many situations, it is necessary to line up the floors of two vehicles, for example, to permit transfer of material or passengers from one vehicle to the other. It is desirable in these cases to have the relative positions of the floor or platforms maintained in the same plane during the transfer operation. In many cases, the level of one of the floors may vary slightly during the transfer operation as a result of different load conditions.

One such example wherein it is desirable to maintain the relative positions of two bodies involves the use of a passenger transfer vehicle where passengers are transferred from the vehicle to the aircraft. One such type vehicle is described in a copending patent application entitled "Aircraft Transfer vehicle," Ser. No. 762,443, filed Sept. 25, 1968, and assigned to the same assignee as the present invention. In a vehicle of this type, passengers are transferred from the vehicle onto an aircraft. During the loading and unloading operation the relative levels of the floors of the transfer vehicle and aircraft may vary because of the variations in load conditions during the transfer operation. These variations in floor levels, if not remedied, create hazardous conditions for passengers moving to or from the vehicle and aircraft.

It is desirable to automatically adjust the levels of the floors of the vehicle and/or aircraft to maintain them relatively constant during transfer operations.

It is an object of this invention to provide a novel system for maintaining two movable bodies in relatively fixed relationship with respect to each other.

It is a further object of this invention to provide a novel system for restoring to predetermined relative positions two main bodies when one of the bodies has moved beyond a predetermined distance with respect to the other.

It is still a further object of this invention to provide a novel system for restoring to predetermined relative positions two bodies when one of the bodies has moved beyond a predetermined distance with respect to the other wherein means are provided to vary said predetermined distance.

A system for maintaining the relative position of a first body with respect to a second body includes an extendable pivotable member attached to the first body and adapted to extend therefrom to contact the second body. The pivotable member is disposed to actuate cam means to open and close selected one of a plurality of switches. The pivotable member is disposed to maintain contact with said second body when the two bodies are moved relative to each other in a set plane. The cam means are moved in accordance with the relative movement of the first and second bodies to control the operation of the switches. Motor means are connected to the switches to move and maintain the first body in a fixed relative position with respect to the second body after the bodies have moved beyond a predetermined distance with respect to each other.

Other objects and advantages of the present invention will be apparent and suggest themselves to those skilled in the art, from a reading of the following specification and claims, in conjunction with the accompanying drawing, in which:

Figure 1:
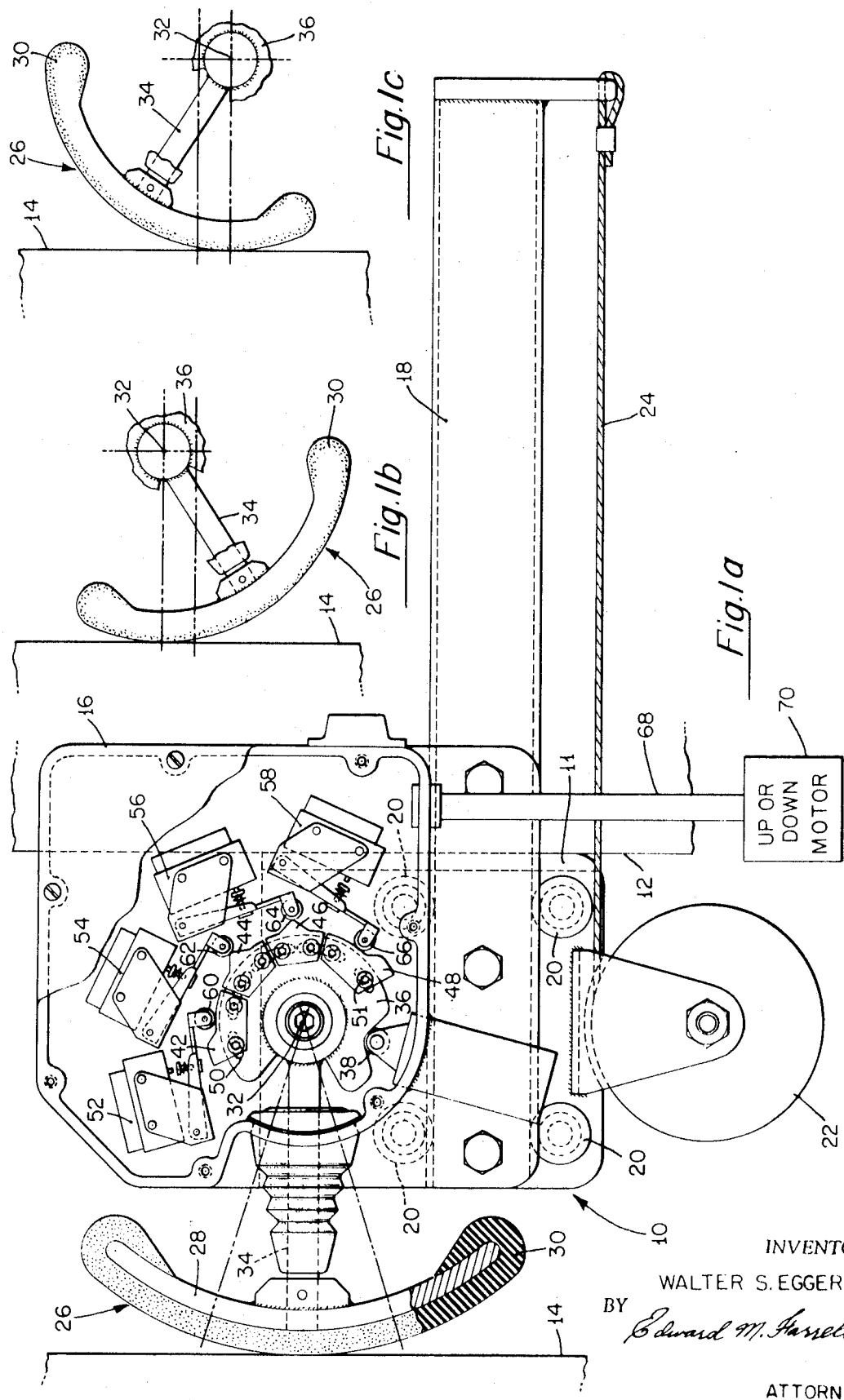
FIG. 1a is a side view illustrating an automatic levelling device, in accordance with the present invention, with the device in a fully retracted position.
FIGS. 1b and 1c illustrate a portion of a pivotable member for different directions of movement.

Referring particularly to FIG. 1a, in the embodiment to be described, it will be assumed that the automatic levelling device 10 is mounted to a vehicle 12, which may be a vehicle for transporting passengers between an airport terminal and an aircraft 14, such as described in the aforementioned copending patent application, for example. In this case, the driver will have brought the vehicle 12 close to the aircraft 14 and has adjusted a ramp or platform disposed to the correct level with respect to the floor of the aircraft 14. Under these conditions, the floor of the ramp is substantially level with the floor of the aircraft and is set to permit passengers to pass from the vehicle 12 onto the aircraft 14, or vice versa. As the passengers pass from one craft to the other, the floor level of the ramp of the vehicle 14 with respect to the floor level of the aircraft 14 may vary. The variations may result from the transfer of passengers, variations in loads between the aircraft and the vehicle, or for other reasons. The present invention is designed to correct for these variations in floor levels which may take place.

The automatic levelling device 10 includes a main frame 11 mounted to the vehicle 12. The levelling device includes a main housing 16 disposed to ride on a rail 18 on a plurality of rollers 20. A wheel or reel 22 receives a cord 24 under tension. The wheel 22 may be spring loaded so that in the absence of any forces the cord 24 will be completely wound on the reel 22. The tension is maintained when the housing 16 is pushed back.

Figure 2:
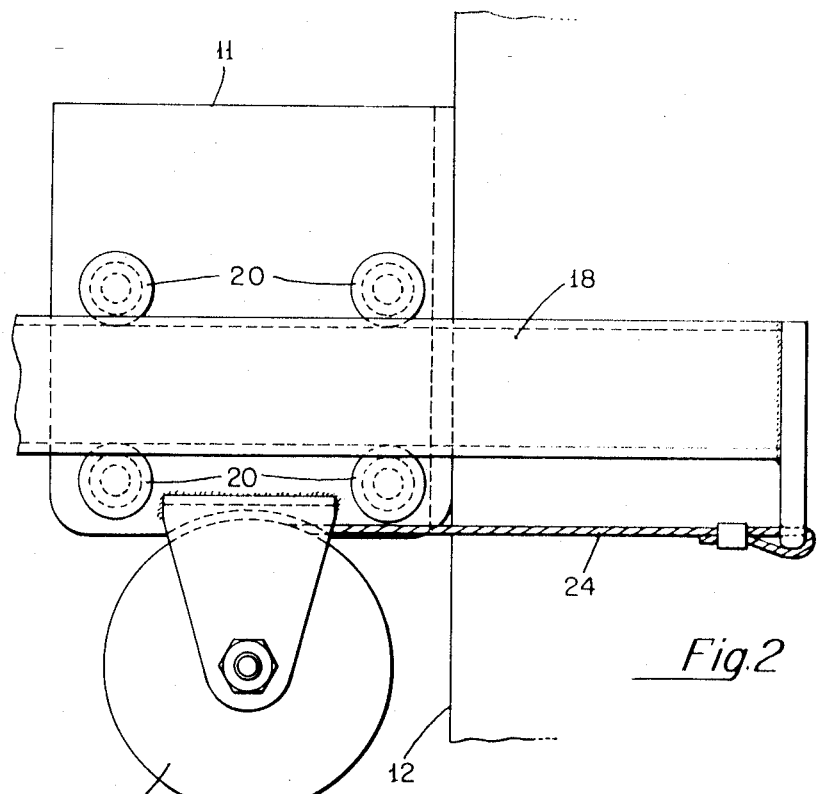
FIG. 2 is the same device as illustrated in FIG. 1 with the automatic levelling device partly retracted.
Figure 3:
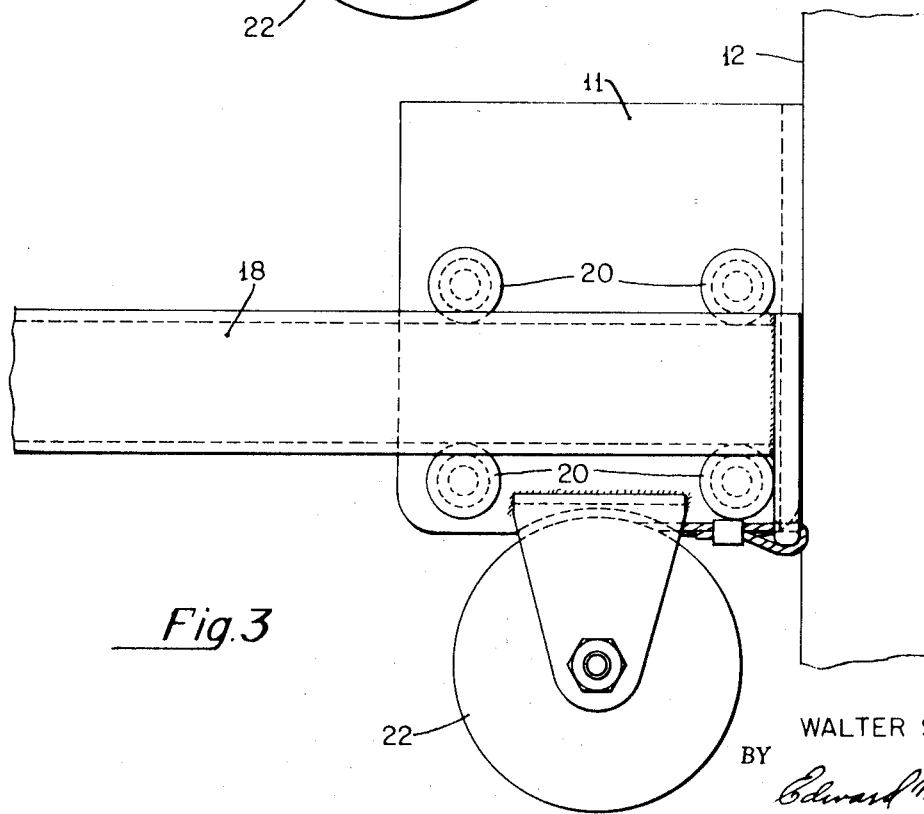
FIG. 3 is the same device illustrated in FIGS. 1 and 2 with the device illustrated being fully extended.

When the vehicle 12 approaches the aircraft 14, a pivotable member 26 makes contact with the surface of the aircraft 14. It is desirable that the element 26 makes firm contact with the surface of the aircraft 14. Therefore the distance between the vehicle 12 and the aircraft 14 is such that pressure is exerted by the aircraft 14 against the member 26 to force the housing 16 backwardly. This causes the cord 24 to be wound on the reel 22 while still maintaining tension to permit good frictional contact between the member 26 and the aircraft 14. FIG. 2 illustrates the device 10 in a partly retracted position and FIG. 3 illustrates the device in a fully retracted position.

The member 26 includes a main arcuate body 28 covered by a soft frictional material 30, which may be rubber, plastic or other suitable material capable of having a good frictional relationship with the surface of the aircraft 14. The main body 28 is pivotably mounted to the housing 16 at pivot point 32 through a shaft element 34. Thus the element 28 is free to move up and down about the pivot point 32. Different up and down positions of the pivotable member are illustrated in FIGS. 1b and 1c. As the element moves up and down the tension is maintained between the rubber coating 30 and the surface of the aircraft 14. The arcuate shape of the member 28 enables the rubber coating 30 to roll along the surface of the aircraft 14 while still maintaining good frictional contact therewith.

Also mounted to the end of the shaft 34 is a member 36 adapted to be moved about the pivot point 32. This member 36 is held in a normally neutral position by a spring loaded roller 38 which is disposed within a groove of the member 36.

Cam means include a plurality of cam elements 42, 44, 46 and 48 mounted to the member 36 by means of screws or other suitable means. The member 36 may include slightly elongated holes 50 to permit the cam members 42, 44, 46 and 48 to be mounted in slightly different positions with respect to each other. After the cam members are mounted in the position desired the screws 51 associated therewith are tightened. Such adjustment screws are well known to those skilled in the art and therefore not shown or described in great detail. However, the means for adjusting the positions of the cam elements slightly with respect to each other provide a feature of the present invention, as will be described.

When the floor or ramp level of the vehicle 12 varies with respect to the aircraft 14, the pivotable member 26 moves about its axis to actuate a plurality of switches which controls a motor to restore the original relative positions of the levels of the floors in the vehicle and aircraft.

The various cam elements 42, 44, 46 and 48 are adapted to actuate a plurality of switches 52, 54, 56 and 58, respectively. The switches include a plurality of rollers 60, 62, 64 and 66, which are disposed to be actuated by the various cam elements to open or close selected switches dependent upon the position of the pivotable element 26. The switches 52, 54, 56 and 58 are actually paired with other switches to provide a redundancy factor in the system. Also, the switches are associated with additional contacts to provide a warning light to indicate faulty operation, as will be described. These additional switches and contacts, while not illustrated in FIGS. 1, 2 and 3 are shown in the schematic diagram of FIG. 4, to be described.

The switches 52, 54, 56 and 58 are connected to a cable 68 to control various motor means 70 which may include an up and a down motor to control the up and down motion of the vehicle 12, as well as appropriate relays. Dependent upon the operating states of the various switches, the motor means 70 will remain in a neutral position or move the vehicle 12 up or down. When the floor level of the vehicle 12 changes with respect to the floor level of the aircraft 14, the motor means 70 will become operative as a result of the actuation of selected switches to return the floor level of the vehicle 12 to its original position with respect to the floor level of the aircraft 14.

In practicing the subject invention, it is realized that certain tolerances must be set. For example, if the degree of movement of the floors of the vehicle and aircraft is very slight or insignificant, the motor means 70 will not be operated, However, if the degree of movement is relatively great or beyond a predetermined limit, the motor means 70 will become operative. This arrangement prevents jitter or oversensitivity in the system which would tend to create a vibrating movement of the floor of the vehicle. The spacing of the cam elements which control the operation of the switches determines the distance at which the restoring motor means 70 becomes operative.

Figure 4:
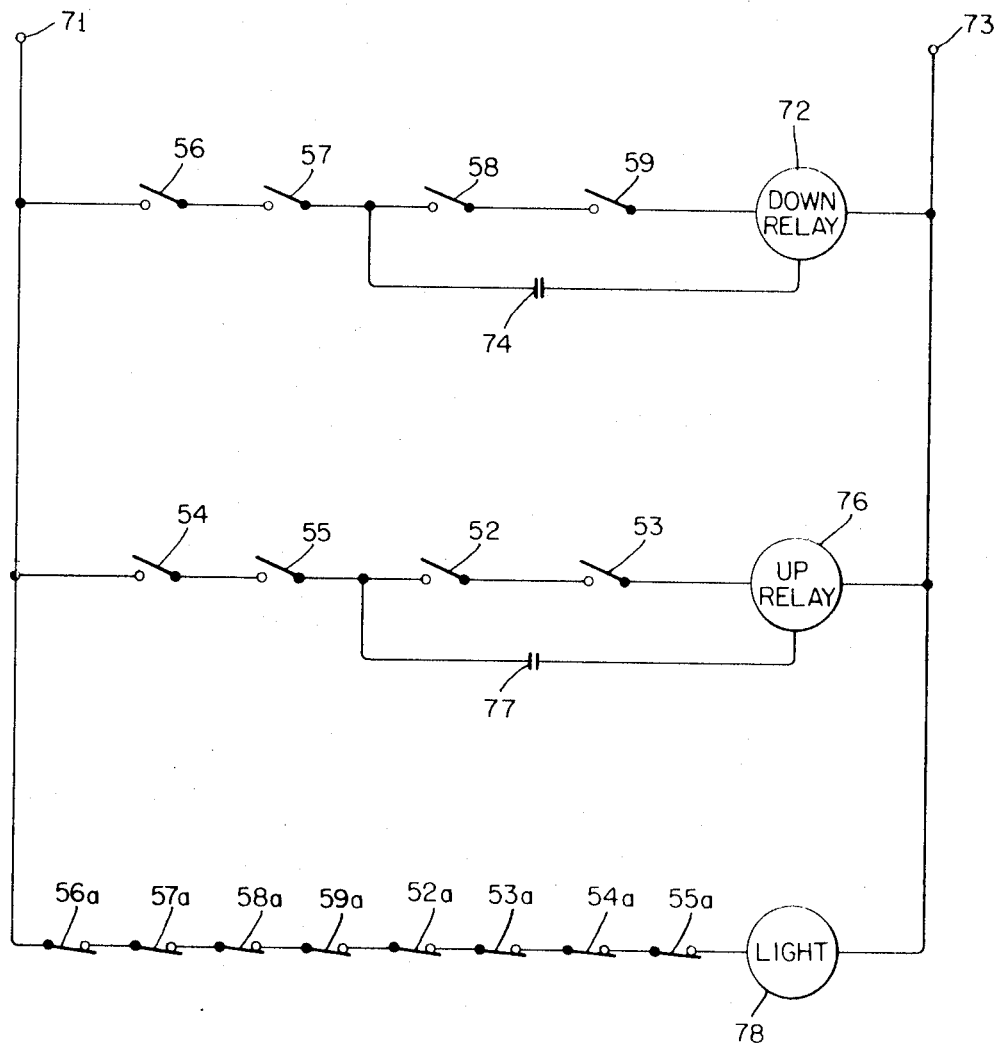
FIG. 4 is a schematic circuit diagram of a switching arrangement which may be used with the device illustrated in FIGS. 1, 2 and 3.

Referring particularly to FIG. 4 along with the other FIGS. of the drawing, let us first assume that the vehicle 12 is moved downwardly. In this case, the pivotable element 26 will be pivoted about the point 32 with the material 30 maintaining contact with the surface of the aircraft 14. This condition is illustrated in FIG. 1c.

When the element 26 is pivoted in a clockwise direction, the member 26 is also turned to rotate the cam elements 42, 44, 46 and 48. Rotation of the cam member 46 causes normally open switches 56 and 57 to close. As mentioned, the switch 57 is not illustrated in FIGS. 1, 2 and 3 but is illustrated in FIG. 4. The closing of the switches 56 and 57 result from the roller 64 moving downwardly from its peak position on the cam element 46. No activation of any restoring forces takes place until a predetermined distance later when the roller 66 contacts the upper portion of the cam element 48. At this later point, normally open switches 58 and 59 are closed. At this time, power is applied from the terminals 71 and 73 through the switches 56, 57, 58 and 59 to the relay 72. The relay 72 closes a pair of holding contacts 74. These contacts permit current to flow through the down relay 72 even after the switches 58 and 59 open.

The operation of the down relay 72 causes the motor means 70 to become operative to cause the vehicle 12 to be moved downwardly. The downward movement of the vehicle 12 causes the pivotable element 26 to be rotated in a counterclockwise direction starting it back to its original position. When this happens, the roller 66 moves downwardly from the upper portion of the cam element 48 to cause the switches 58 and 59 to open. However, since the roller 64 has not yet reached its peak position on the cam element 46, the switches 56 and 57 will remain closed to keep the relay 72 operative.

As the pivotable element 26 continues its counterclockwise rotation, the roller 64 eventually reaches the peak of the cam element 46 causing the switches 56 and 57 to open. At this point, the relay 72 becomes inoperative. The motor means 70 will also become inoperative and the system will be at its original or neutral position. It is noted that which the switch 54 closes during the operation described, the switch 52 remains open preventing the up relay 76 from operating.

Let us now consider a situation in which the vehicle 12 is moved upwardly. When this happens the pivotable element 26 is pivoted about the pivot point 32 while continuing to engage the surface of the aircraft 14. This condition is illustrated in FIG. 1b.

When the pivotable element 26 is moved in a counterclockwise direction, the roller 62 will move down from its peak position on the cam element 44 to close the switches 54 and 55. Again, switch 55 is not illustrated in FIG. 1, it being understood that the switch is in series with the switch 54. The closing of the switches 54 and 55 does not effect the operation of the motor means 70 until the member 36 has moved beyond predetermined limits. At this point, the roller 60 rides up against the upper portion of the cam element 42 to eventually close the normally open switches 52 and 53.

With all the switches 54, 55, 52 and 53 closed, an up relay 76 becomes operative to close a pair of holding contacts 77.

Operation of the relay 76 causes the motor means 70 to become operative to move the vehicle 12 downwardly. This downward movement continues until the switches 52 and 53 are open. At this point, the relay 76 continues to operate since the switches 54 and 55 are still closed. After the movement has proceeded beyond a predetermined distance the roller 60 moves off the high portion of the cam element 42 and the switches 54 and 55 open thereby making the relay 76 inoperative. At this point, the motor means 70 becomes inoperative and the system is restored to its original or equilibrium position. It is noted that during the down operation, the up relay 72 will not be affected since the switches 58 and 59 will remain open.

It is noted that the various switches include multiple contacts. Sets of contacts are provided in the switches which are normally closed and adapted to be opened when their counterparts are closed. For example, a light 78 may be operative in a vehicle when all the switches 52a to 59a are closed. This will indicate that the switches are operating normally prior to any operation of the vehicle 12. When any one of the switches are defective or open, the light 78 will be out indicating some trouble in the switching arrangement.

It is noted that the various cam elements 42, 44, 46 and 48 may be adjusted slightly to vary the distance necessary to operate the motor means 70. This arrangement makes it possible to adjust the system so that no operation will take place unless the positions of the floor of the vehicles have moved beyond a predetermined distance, for example, one inch.

The switching means may be considered as two sets of switches disposed to be sequentially operated. The first set becomes operative when the floor of the vehicle moves from its neutral position with the second set becoming operative at a limit point at which a restoring motor is made operative. The restoring operation continues until the first set of switches is reactivated.

While the subject invention has been described in connection with a passenger transfer vehicle and an aircraft, it is apparent that its application may relate to any two bodies wherein it is desired to restore their relative positions while various operations, such as varying loads, take place. Conceivably some elevator systems could use the present invention.

Also, while the invention has been described in connection with two bodies which are moveable in a vertical plane, some situations may arise where corrections must be made when the bodies are movable in a horizontal or angular plane.

What is claimed is:

1. A system for maintaining the relative position of a first body with respect to a second body comprising an extendable pivotable member, mounting means for said pivotable member secured to said first body, said mounting means having tension means to extend said pivotable member to physically contact said second body and to maintain it in contact therewith when said first and second bodies are moved relative to each other in a plane, a plurality of switches, cam means including a plurality of cam elements disposed to engage said plurality of switches and responsive to pivotable movement of said pivotable member to open and close selected ones of said switches in accordance with the relative movement of said first and second bodies, motor means for moving said first body, said plurality of switches being spaced with respect to said cam elements to operate said motor means only after the relative positions of said first and second bodies have varied beyond a predetermined distance, means for varying the positions of said cam elements with respect to said switches for varying said predetermined distance at which said motor means becomes operative, said plurality of switches including two sets of switches with the first set to control the movement of said first body in one direction and the other set to control the movement of said first body in a second direction, each set of switches including spaced apart control switches to be sequentially operated when said pivotable member is moved beyond a predetermined distance, and said motor means being responsive to the operating states of said switches to move and restore said first body to its original relative position with respect to said second body when one of said bodies is moved with respect to the other.

2. The invention as set forth in claim 1 wherein said mounting means includes a housing containing said plurality of switches disposed to ride on a rail element.

3. The invention as set forth in claim 2 wherein said tension means includes a spring loaded wheel and a cord normally urging said pivotable member forward.

4. The invention as set forth in claim 3 wherein an indicator means is provided responsive to the operation of said plurality of switches to indicate the operating conditions thereof.

* * * * *